United States Patent [19]

Janus et al.

[11] Patent Number: 5,618,362
[45] Date of Patent: Apr. 8, 1997

[54] RADIAL PLY TIRE WITH BELT-SHAPED REINFORCING INSERT

[75] Inventors: Jonny Janus, Düsseldorf; Wolfgang Markewitz, Ratingen, both of Germany

[73] Assignee: Tyre Consult Venlo B. V., Niederlande, Germany

[21] Appl. No.: 365,569

[22] Filed: Dec. 28, 1994

[30] Foreign Application Priority Data

Jan. 25, 1994 [DE] Germany ............... 44 02 068.6

[51] Int. Cl.⁶ ............... B60C 9/08; B60C 9/18
[52] U.S. Cl. ............ 152/530; 152/200; 152/526; 152/533
[58] Field of Search ............... 152/185–194, 152/196–200, 526, 530, 533

[56] References Cited

U.S. PATENT DOCUMENTS

| 3,842,885 | 10/1974 | Alban | 152/200 X |
| 5,417,266 | 5/1995 | Janus | 152/200 |

FOREIGN PATENT DOCUMENTS

| 26519 | 5/1930 | Australia | 152/199 |
| 222239 | 1/1958 | Australia | 152/533 |
| 0357826 | 3/1990 | European Pat. Off. | 152/526 |
| 420325 | 4/1947 | Italy | 152/200 |
| 1743911 | 6/1992 | U.S.S.R. | 152/526 |

*Primary Examiner*—Adrienne C. Johnstone
*Attorney, Agent, or Firm*—Pearne, Gordon, McCoy & Granger

[57] ABSTRACT

A radial ply tire for vehicle wheels has a torus-shaped body of elastomeric material which contains a belt-shaped reinforcing insert which has in the region underneath the tread of the tire a strip which is stretchable, pre-loadable and, under the influence of external forces, restorable in the circumferential direction of the tire. The strip of the reinforcing insert contains apertures extending largely transversely with respect to the circumferential direction of the tire. The apertures extend only partially through the strip in a transverse direction and are arranged in rows, the apertures being parallel and offset with respect to one another in successive rows. Between them there are transversely extending unbroken portions which provide the desired transverse stiffness of the belt.

13 Claims, 2 Drawing Sheets

RADIAL PLY TIRE WITH BELT-SHAPED REINFORCING INSERT

FIELD OF THE INVENTION

The invention relates to a radial ply tire for a vehicle wheel of the kind comprising a torus-shaped body of elastomeric material having a tread portion, and a belt-shaped reinforcing insert arranged in the body, the reinforcing insert including, in a region radially inwards of the tread of the tire, a reinforcing strip which is adapted to stretch, compress and be pre-loaded in a circumferential direction of the tire, and return, under the influence of internal and external forces.

The strip of the reinforcing insert in such an arrangement forms a strengthener for the lateral stiffness or side stiffness of the elastically pre-loadable belt construction.

BACKGROUND OF THE INVENTION

For tangentially elastic belt constructions of vehicle tires strip-shaped strengtheners are known as so-called transverse belts, which can be pre-shaped radially in a number of planes (EP 0 357 826). These sinusoidal or similarly wavy strips of the transverse belt are, it is true, in a position to perform the desired longitudinal stretching, but they are frequently subject to tears or similar damage on added local deformations of the belts in a radial and lateral direction. Moreover the known wavy strips of the transverse belt take up a relatively large amount of space as they have to be covered over by the rubber matrix over the height of the amplitudes of the waves for mechanical and manufacturing reasons. This has the consequence of involving a relatively large volume of the belt which both adds to cost and also wastes unnecessary energy through internal friction in the body of the belt.

SUMMARY OF THE INVENTION

The invention aims to provide a radial ply tire for a vehicle wheel with a strip-shaped transverse belt serving as a strengthener, which on the one hand achieves adequate transverse stiffness of the tire and on the other hand is sufficiently stretchable, pre-loadable and restorable in the direction of the circumference of the tire without thereby taking up unnecessary space or volume in the body of the tire.

According to the invention, in a radial ply tire for a vehicle wheel of the kind set forth the reinforcing strip includes apertures extending substantially transversely with respect to the circumferential direction of the tire, each aperture extending only partially through the strip, in a transverse direction and the apertures being arranged in rows and offset with respect to one another in successive rows.

This provides a strip which is elastic in a tangential direction and formed in such a way that in a state of equilibrium, that is to say free of stress, it extends virtually in a single plane, that is to say it does not have any waves or other shapes but corresponds in its height to virtually only the thickness of the material.

In contrast to known constructions of such strips or transverse belts which extend radially in several planes in order to provide deformability in a circumferential direction, the strip according to the invention in its unstressed state extends virtually in one plane in the direction of the circumference of the radial ply tire and despite this is still elastic, that is to say stretchable, pre-loadable and compressible, in a tangential direction.

The apertures may be cut-out portions of the strip, extending parallel to one another. The cut-out portions may be slot-like openings extending in a transverse direction with webs remaining between them. The openings are preferably arranged in rows and they can also be arranged offset in succeeding rows so that no circumferentially stiffening cross-section is obtained.

The strip may alternatively be a strip of meandering shape which contains transversely extending cut-out portions extending from its side edges and starting alternately from one side edge and the other, and terminating near the respective opposite side edge.

On the other hand it is also possible to form the strip from at least one compression-resistant and tension-resistant endless filament. Several filaments could be wound around one another to form a cord. The filaments are arranged in the same plane in approximately zig-zag form in such a way that the reversals, for example in arcuate form, of the individual filaments allow at the ends or longitudinal edges of the strip an elastically useful deformation in the tangential direction. An endless strengthener formed in this manner offers the minimum possible resistance to the tangential deformation mechanism of the radial ply tire, which has a particularly advantageous effect on the energy behavior of the tire.

The compression-resistant endless filaments preferably extend almost at right angles to the direction of running of the tire, that is to say laterally and are connected together at the two edges of the transverse belt by respective reversals in direction of almost 180°, but compression-resistant and tension-resistant in both lateral directions. Thereby under the effect of side forces there is obtained a mutual support of the adjacent transverse filaments.

A further advantage of this embodiment is the outstanding radial flexibility which is required for passing over uneven road surfaces. The resulting reduction in the resistance to deformation of the tire in the region of the belt has an advantageous effect on the reduction in the radial and tangential damping action of the tire.

Since, in the above-mentioned embodiments of the strip, it can be arranged to lie in one plane, it can be manufactured from specially shaped steel strip or stiff synthetic resin, or from steel filaments or steel wires. In every case there is achieved a sufficient transverse stiffness of the strip or body serving as the strengthener of the belt.

BRIEF DESCRIPTION OF THE DRAWING

The invention will be further explained in embodiments by way of example illustrated diagrammatically in the accompanying drawing, in which.

DESCRIPTION OF THE PREFERRED EMBODIMENTS

Figure 1:
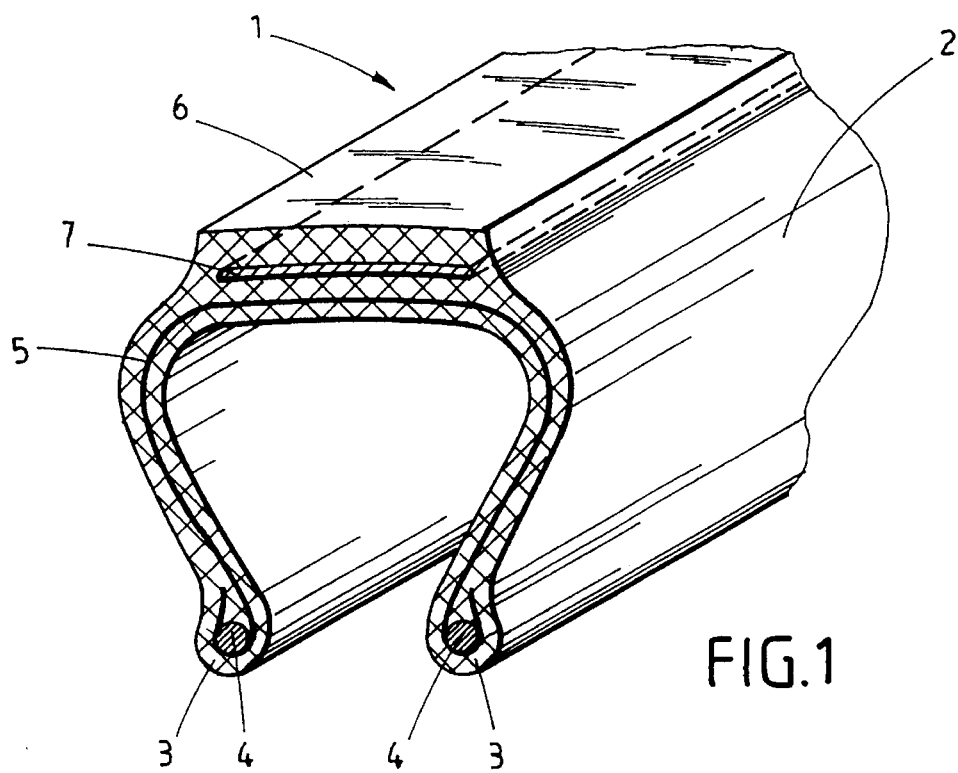
FIG. 1 is a perspective sectioned partial view of a radial ply tire constructed in accordance with the invention.

The pneumatic tire or radial ply tire 1 illustrated in FIG. 1 for vehicle wheels, not illustrated further, has a torus-shaped body 2 of elastomeric material with beads 3 formed on it for engaging the wheel, not shown. Embedded in each bead 3 there is a core or wire 4 of inextensible material such as wire rope. Extending within the torus-shaped body from bead to bead is a cord insert 5 which serves as a kind of protection or reinforcement for the rubber material of the torus-shaped body 2.

Within the torus-shaped body 2 and underneath the tread 6 of it there is embedded in the rubber material in addition to a circumferential belt, not shown here, a belt-shaped reinforcing insert 7 which is described in the following in detail in conjunction with three embodiments by way of example illustrated in FIGS. 2, 3 and 4.

Figure 2:
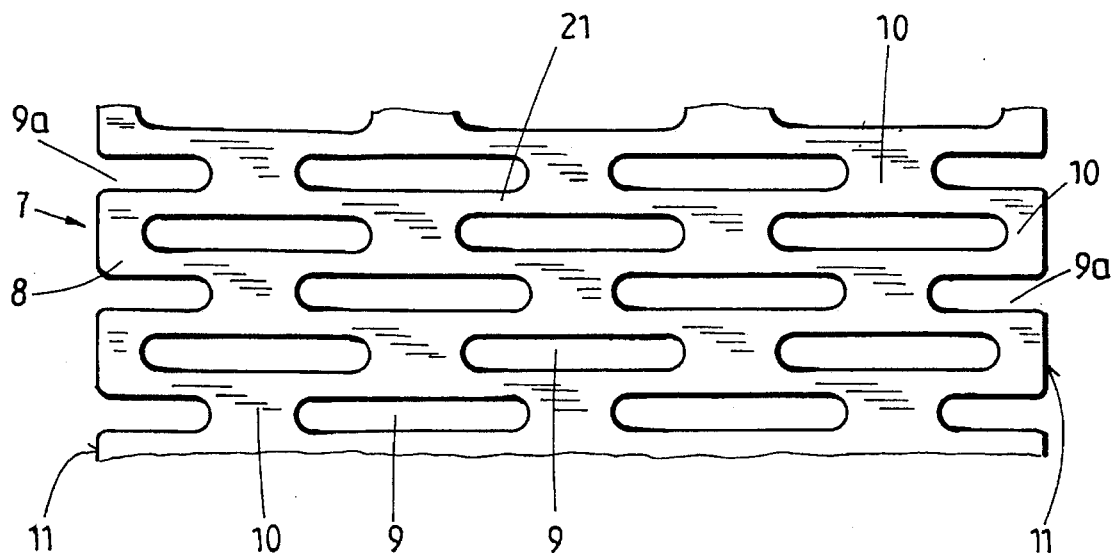
FIG. 2 is a plan view of a portion or section of a belt strip of the tire according to one embodiment of the invention.

In the embodiment according to FIG. 2 the belt-shaped insert 7 comprises a flat strip 8 which can be made of steel or of synthetic resin and extends in the direction of the circumference of the tire 1 as a transverse strip of the belt. This strip 8 contains a multitude of strip-shaped or slot-like openings 9 which extend transverse to the circumferential direction of the tire 1 and thereby of the insert 7. These openings are arranged in successive rows and within these rows they are offset parallel to one another in a transverse direction, as can be seen in FIG. 2.

Between adjacent openings 9 in each row of openings there are webs 10 which separate the openings 9 from one another and which, as a consequence of their zig-zag sequence, hold the strip 8 together as a whole. In this arrangement each web 10 lies opposite an opening 9 of the adjacent row of openings so that elastic extension of the strip 8 in a longitudinal direction or also elastic compression is achieved by the co-operation of the individual openings 9 and the webs 10 lying opposite them.

At the longitudinal edges 11 of the strip 8 there are outwardly open notches 9a in every second row of openings 9 so that also in the region of the side edges or longitudinal edges 11 of the strip 8 the desired elastic extensibility, pre-loadability, restoring action and compression ability of the strip 8 in a longitudinal direction is achieved.

Between the rows of mutually offset openings 9 and 9a there are respective uninterrupted transverse webs 21 which extend from one longitudinal edge 11 of the strip 8 to the other and take care of providing the transverse stiffness of the strip 8.

By matching the material thickness of the strip 8 and the relationship of the dimensions of the openings 9, the webs 10 and the transverse webs 21 there can be set a predetermined progressive tangential spring characteristic of the strip 8 which if necessary makes it possible to do without further tangential spring elements of the belt without adversely affecting the lateral stiffness of the belt and thereby of the radial ply tire 1 as a whole. The spring characteristic of the strip 8 according to FIG. 2 can furthermore be modified by the Shore hardness of the rubber mixture and its coating thickness. Thus, for a given rubber mixture, thin rubber layers engaging the strip 8 on both sides stiffen the spring characteristic of the strip 8 as a consequence of their low deformation clearance whereas thicker layers of the same mixture engaging against the strip lead to a softer spring characteristic. Accordingly, the volume and thereby also the weight of the belt and of the tire as a whole can be significantly reduced.

Figure 3:
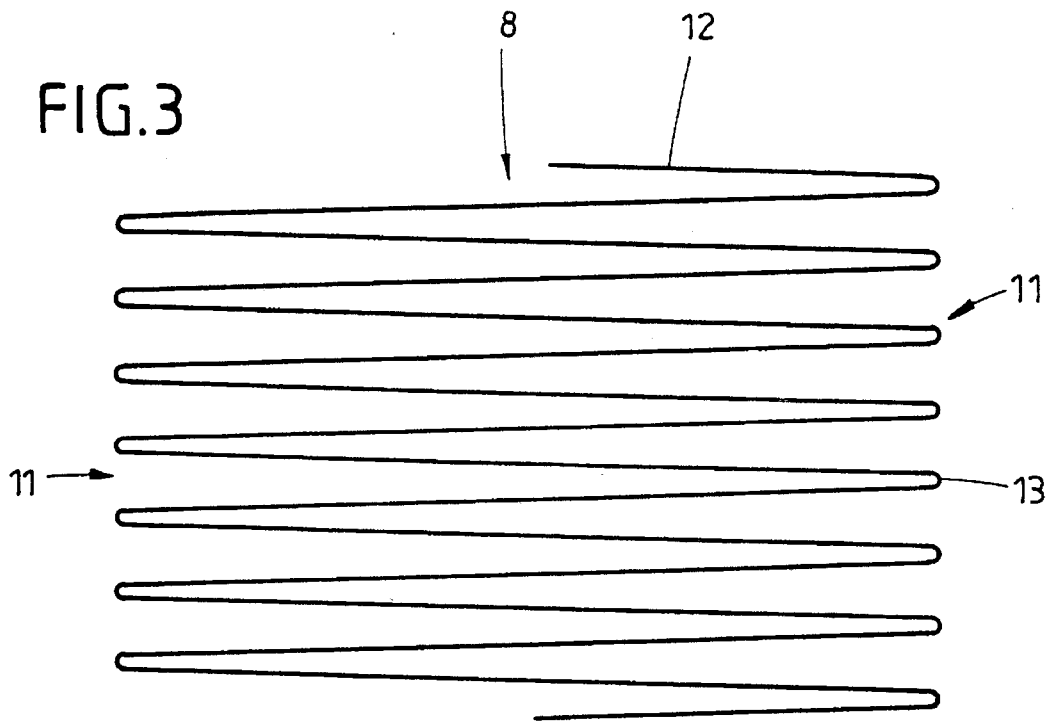
FIG. 3 is a view similar to FIG. 2 showing a modified embodiment of the belt strip and FIG. 4 is a view of a further embodiment of the belt strip.

In the embodiment according to FIG. 3 the strip 8 forming the belt-shaped insert 7 is formed as an endless filament 12 which follows a zig-zag path. At the side edges 11 of the strip 8 there are arcuate reversals of direction 13 which on the one hand take care of providing sufficient lateral stability and on the other hand achieve the elastic stretchability, pre-load ability and restoring action of this particular strip.

Figure 4:
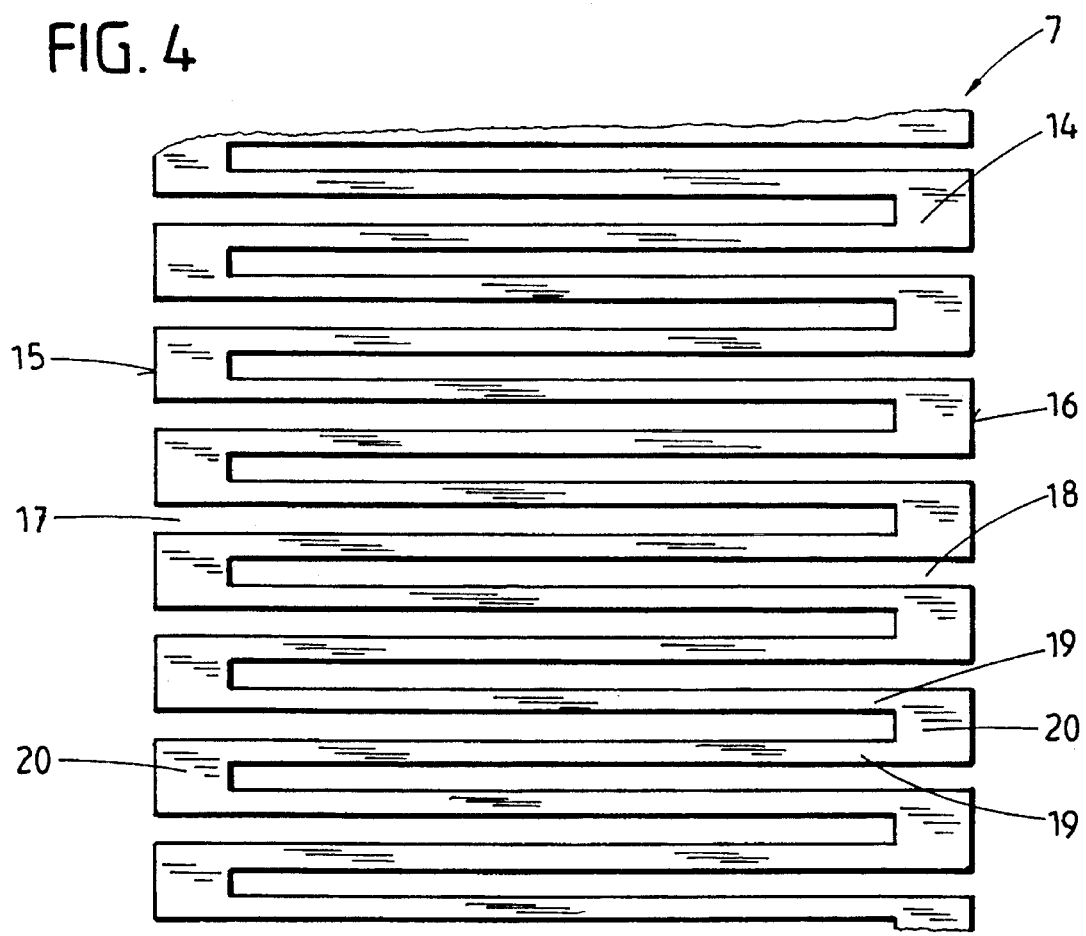

In the embodiment according to FIG. 4 the belt-shaped insert 7 is manufactured from a strip-shaped body 14 of stiff synthetic resin or steel. This metal-strip-shaped or foil-shaped strip 14 contains, extending alternately from its side edges 15 and 16, substantially rectangular deep inwards cuts 17 and 18, which overlap one another, so that the strip-shaped body 14 comprises meandering web-shaped portions 19 extending parallel to one another and transversely with respect to the strip 14 and alternating with these there are webs 20 connecting them at one or the other side edge 15 or 16. Accordingly, the strip 14 is capable of stretching and contracting or squeezing together in a longitudinal direction but is laterally stable in a transverse or lateral direction.

In the embodiments according to FIGS. 3 and 4 the filaments 12 (FIG. 3) or the web-shaped portions 19 (FIG. 4) which run in a direction transversely with respect to the strip take care of providing the necessary transverse stiffness of the strip in question. In a most preferred embodiment, the strip has substantially transversely extending stiffening portions having opposed ends, each end of a stiffening portion being joined to a corresponding end of an adjacent stiffening portion, whereby the stiffening portions are joined alternately by the ends.

Preferably, in all the foregoing embodiments the slot-like structured strip is dimensioned, for example by material strength and relationship between width and length of the webs such that under tangential tension loading (through internal pressure in the tire and centrifugal force) of the strip the transversely extending webs lift away somewhat from their flat state and thereby allow bulging respectively between the nodes or webs that connect them together in an offset manner, so that an elastic spring action arises as a result of this deformation of the webs. Therefore the webs alter their angle with respect to the circumferential curvature of the tire under tension loading.

A transverse belt strip of such dimensions is preferably applied to the carcass blank in a stress-free and therefore flat condition with a circumferential length corresponding to 100% of the shaped body (hot mould) so that the transversely extending webs remain flat and therefore free of stress when the tire has been vulcanized.

When a radial ply tire manufactured in such a way as described immediately above and provided with a rate of resistance to or allowable extension of around 101 to 104%, is put under tension loading in operation, it stretches its transversely extending webs in a circumferential direction with a change in angle. In this process the transverse belt strip increases its structural height significantly as a consequence of the radially rising webs. From the flat strip which lies in a single plane there is produced by deformation of the transverse belt under tension a geometrically three-dimensional structure.

When the transverse belt strip structured with slits and deformed under, tension loading in accordance with the invention is subjected radially to a large force as is the case in the supporting surface of the tire by carrying the wheel load, the upstanding transversely extending webs are thereby pressed back from their increased structural height again into their original flat position, whereby however, simultaneously in this loaded portion of the circumference of the belt the elastic stretching of for example 102% to 100% allowed by the alteration in angle previously of the transversely extending webs is mechanically restored.

By this mechanical load-controlled forced return deformation of the transverse belt strip the spring action of the circumferential belt is kinematically extremely effectively assisted.

In the tire as ready for use there result for the slit-shaped structured transverse belt strip according to the invention thereby in the transverse and longitudinal section two geometrically completely independent shapes:

A) In the unloaded periphery the transverse belt strip receives as a consequence of the elastic extension caused by the tension load a radially increased structural height through the alteration in angle of the webs. This geometrical alteration acts significantly on the inherent oscillation behavior of the belt, which suppresses premature occurrence of resonance nodes (standing waves).

B) In the loaded state the radially acting wheel load forces the mechanical kinematic shortening of the transverse belt strip back-into the original flat structural height.

In this flat state the slot-shaped structured transverse belt strip can also very easily match itself to all unevenesses which occur in the ground by local bending actions (within the composite structure).

Therefore in the unstressed state the transverse belt strip extends flat in one plane and alters itself under tension load, in modified embodiments, by increasing the web angle radially in its structural height, that is three-dimensionally, and can thereby stretch elastically. In the elastically stretched state of the strip the webs are deformed back by radial loading again flat into the original plane, whereby the circumferential stretching is kinematically forcibly restored. The transverse belt strip is incorporated in the tire blank in its flat condition with a circumferential length which is about 100% with reference to the dimension of the shape of the tire press and under operating conditions it can stretch elastically up to 105%. In operation the structural height of the belt strip alters between the loaded and unloaded circumference and thereby its longitudinal section.

In a preferred embodiment, the strip is adapted to stretch by up to about 4% in a circumferential direction from a stress-free rest condition. In a most preferred embodiment, the strip is adapted to stretch by up to about 2% in a circumferential direction from a stress-free rest condition.

What is claimed is:

1. A radial ply tire for a vehicle wheel comprising a torus-shaped body of elastomeric material having a tread portion and a reinforcing insert arranged in said body, said reinforcing insert including in a region radially inwards of said tread portion a reinforcing strip adapted to stretch, compress and be pre-loaded in a circumferential direction of said tire, and adapted to be restored under the influence of external forces, wherein said reinforcing strip includes a length extending in said circumferential direction, a width extending between opposed side edges of said strip and a thickness extending in a radial direction of said tire, said thickness being substantially less than said length or width, said reinforcing strip also including apertures extending substantially transversely with respect to said circumferential direction, each said aperture extending only partially through said strip in said transverse direction and said apertures being arranged in rows and being offset with respect to one another in successive said rows, said apertures being cut-out portions of said strip, said cut-out portions forming web-shaped portions therebetween, said cut-out portions and web-shaped portions having similar dimensions in said circumferential direction.

2. A radial ply tire as claimed in claim 1, wherein said apertures are parallel to one another.

3. A radial ply tire as claimed in claim 2, wherein said cut-out portions extend transversely from said side edges of said strip, starting alternately at one said side edge and terminating near said opposite side edge, to form said strip as a meandering shape.

4. A radial ply tire as claimed in claim 3, wherein said strip is made of a stiff synthetic resin.

5. A radial ply tire as claimed in claim 3, wherein said strip is made of sheet steel.

6. A radial ply tire as claimed in claim 1, wherein said strip is adapted to stretch by up to 5% in said circumferential direction from its stress-free rest condition.

7. A radial ply tire as claimed in claim 6, wherein said strip is adapted to stretch by up to about 4% in said circumferential direction from its stress-free rest condition.

8. A radial ply tire as claimed in claim 7, wherein said strip is adapted to stretch by up to about 2% in said circumferential direction from its stress-free rest condition.

9. A radial ply tire as claimed in claim 1, wherein layers of elastomeric material engage the strip on both sides and the spring characteristic of said strip is cooperatively determined by the Shore hardness of the elastomeric material and the thickness of said elastomeric material.

10. A radial ply tire as claimed in claim 1, wherein said web-shaped portions have opposed ends, each said end of a said web-shaped portion being joined to a corresponding end of an adjacent said web-shaped portion, whereby said web-shaped portions are joined alternately by the said ends.

11. A radial ply tire as claimed in claim 1, wherein said web-shaped portions are joined by side webs alternately at one and then the other of said side edges of said strip.

12. A radial ply tire as claimed in claim 11, wherein said cut-out portions abut adjacent web-shaped portions.

13. A radial ply tire as claimed in claim 12, wherein said cut-out portions are substantially rectangular.

* * * * *